(12) United States Patent
Hsiang

(10) Patent No.: US 10,887,594 B2
(45) Date of Patent: Jan. 5, 2021

(54) ENTROPY CODING OF CODING UNITS IN IMAGE AND VIDEO DATA

(71) Applicant: MediaTek Inc., Hsinchu (TW)

(72) Inventor: Shih-Ta Hsiang, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/502,347

(22) Filed: Jul. 3, 2019

(65) Prior Publication Data

US 2020/0014928 A1    Jan. 9, 2020

Related U.S. Application Data

(60) Provisional application No. 62/694,151, filed on Jul. 5, 2018.

(51) Int. Cl.
| | | |
|---|---|---|
| *H04N 19/13* | (2014.01) | |
| *H04N 19/182* | (2014.01) | |
| *H04N 19/176* | (2014.01) | |
| *H04N 19/70* | (2014.01) | |
| *H04N 19/96* | (2014.01) | |
| *H04N 19/119* | (2014.01) | |

(52) U.S. Cl.
CPC ........... *H04N 19/13* (2014.11); *H04N 19/119* (2014.11); *H04N 19/176* (2014.11); *H04N 19/182* (2014.11); *H04N 19/70* (2014.11); *H04N 19/96* (2014.11)

(58) Field of Classification Search
CPC .... H04N 19/13; H04N 19/182; H04N 19/119; H04N 19/70; H04N 19/96; H04N 19/176
See application file for complete search history.

(56) References Cited

U.S. PATENT DOCUMENTS

| | | | | |
|---|---|---|---|---|
| 2011/0310976 A1* | 12/2011 | Wang | ..................... | H04N 19/46 |
| | | | | 375/240.24 |
| 2013/0083844 A1 | 4/2013 | Chong et al. | | |
| 2013/0315300 A1* | 11/2013 | Lee | ..................... | H04N 19/176 |
| | | | | 375/240.02 |
| 2013/0322540 A1* | 12/2013 | Yamori | ................ | H04N 19/597 |
| | | | | 375/240.16 |

(Continued)

FOREIGN PATENT DOCUMENTS

| | | |
|---|---|---|
| CN | 103563381 A | 2/2014 |
| CN | 104270635 A | 1/2015 |
| CN | 104811711 A | 7/2015 |

OTHER PUBLICATIONS

China Intellectual Property Administration, International Search Report and Written Opinion for International Patent Application No. PCT/CN2019/094803, dated Sep. 30, 2019.

*Primary Examiner* — Zaihan Jiang
(74) *Attorney, Agent, or Firm* — Han IP PLLC; Andy M. Han

(57) ABSTRACT

A video coder that performs entropy coding of a syntax element for partitioning a block of pixels is provided. The video coder receives a current block of pixels of an image. The video coder encodes or decodes the current block of pixels by partitioning the current block of pixels according to a partitioning indicator. The partitioning indicator is entropy coded as a syntax element of a bitstream by using a context model that is selected based on a partitioning structure of the current block of pixels or of a neighboring block of pixels of the current block of pixels.

11 Claims, 12 Drawing Sheets

(56) References Cited

U.S. PATENT DOCUMENTS

| | | | |
|---|---|---|---|
| 2014/0219335 A1* | 8/2014 | Lee | H04N 19/136 |
| | | | 375/240.02 |
| 2014/0297267 A1* | 10/2014 | Spencer | G06F 40/274 |
| | | | 704/9 |
| 2016/0227245 A1* | 8/2016 | Liu | H04N 19/186 |
| 2016/0373756 A1* | 12/2016 | Yu | H04N 19/176 |
| 2017/0223379 A1* | 8/2017 | Chuang | H04N 19/593 |
| 2017/0295378 A1* | 10/2017 | Que | H04N 19/436 |
| 2017/0339425 A1* | 11/2017 | Jeong | H04N 19/176 |
| 2018/0199072 A1* | 7/2018 | Li | H04N 19/96 |
| 2018/0205971 A1* | 7/2018 | Lin | H03M 7/40 |
| 2018/0205972 A1* | 7/2018 | Piao | H04N 19/44 |

* cited by examiner

ENTROPY CODING OF CODING UNITS IN IMAGE AND VIDEO DATA

CROSS REFERENCE TO RELATED PATENT APPLICATION(S)

The present disclosure is part of a non-provisional application that claims the priority benefit of U.S. Provisional Patent Application No. 62/694,151, filed on 5 Jul. 2018. Contents of above-listed applications are herein incorporated by reference.

TECHNICAL FIELD

The present disclosure relates generally to video processing. In particular, the present disclosure relates to methods of entropy coding of video pictures or images.

BACKGROUND

Unless otherwise indicated herein, approaches described in this section are not prior art to the claims listed below and are not admitted as prior art by inclusion in this section.

High-efficiency video coding (HEVC) is the latest video coding standard developed by the Joint Collaborative Team on Video Coding (JCT-VC). In HEVC, a coded picture is partitioned into non-overlapped square block regions represented by the coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. An intra (I) slice is decoded using intra prediction only. A predictive (P) slice is decoded using intra prediction or inter prediction using at most one motion vector and reference index to predict the sample values of each block.

One or more prediction units (PU) are specified for each coding unit (CU). The prediction unit, together with the associated CU syntax, works as a basic unit for signaling the predictor information. The specified prediction process is applied to predict the values of the associated pixel samples inside the PU. A CU can be split into one, two, or four PUs, depending on the selected PU type. HEVC defines eight types of partitions for dividing a CU into PUs.

A CU can be further partitioned using the residual quadtree (RQT) structure for representing the associated prediction residual signal. The leaf nodes of the RQT correspond to the resulting transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and quantized coefficient values are coded in the bitstream. The minimum and maximum transform block sizes are specified in the sequence parameter set.

In the HEVC, the terms coding tree block (CTB), coding block (CB), prediction block (PB), and transform block (TB) are defined to refer to the 2-D sample array of one-color component from the associated CTU, CU, PU, and TU, respectively. A CTU thus consists of one luma CTB, two chroma CTBs, and associated syntax elements in a color picture not coded using three separate color planes. The signaled coding tree partitioning is generally applied to both luma blocks and chroma blocks, although some exceptions apply when certain minimum size constraints are encountered.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provides a video coder that performs entropy coding of a syntax element for partitioning a block of pixels. The video coder receives a current block of pixels of an image. The video coder encodes or decodes the current block of pixels by partitioning the current block of pixels according to a partitioning indicator. The partitioning indicator is entropy coded as a syntax element of a bitstream by using a context model that is selected based on a partitioning structure of the current block of pixels or a partitioning structure of a neighboring block of pixels of the current block of pixels. The partitioning structure of the current block of pixels or the partitioning structure of the neighboring block of pixels is used to determine a context index increment for selecting the context model. The partitioning structure of the current block of pixels may specify a split depth or a split shape of the current block of pixels.

In some embodiments, the partitioning indicator indicates whether to perform binary tree split or multi-type split of the current block of pixels, while the context model is selected based on a number of neighboring blocks of pixels having split depths greater than the current block of pixels. The context model may further be selected based on a binary tree depth of the current block of pixels. In some embodiments, the partitioning indicator indicates an orientation of the partitioning of the current block of pixels, and the context model is selected based on a shape of a partitioned unit of the current block of pixels. The context model may further be selected based on a binary tree depth of the partitioned unit. In some embodiments, the partitioning indicator indicates whether to perform quad-tree split of the current block of pixels, and the context model is selected based on a number of neighboring blocks of pixels having quad-tree depths greater than the current block of pixels.

In some embodiments, the context model for entropy coding a partitioning indicator is selected based on a number of neighboring blocks of pixels having quad-tree depths greater than the current block of pixels. The context model may further be selected based on a quadtree depth of the current block of pixels. In some embodiments, the context model is selected based on a split depth of the current block of pixels and split depths of two neighboring blocks of pixels. In some embodiments, the context model is selected based on widths, heights, and split depths of current block of pixels and the neighboring blocks of pixels.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Some embodiments of the disclosure provide a video coder (e.g., encoder and/or decoder) that entropy encodes or decodes a partitioning structure for splitting a block of pixels. For example, a recursive binary tree or multi-type tree structure may be employed for partitioning a CTU into one or multiple the CUs by the video coder. The representation of the coding tree structure is entropy coded by the context-based adaptive binary arithmetic coding (CABAC) mode. When selecting a context model for entropy coding the CU partitioning structure, the video coder may consider various types of split depths, including the binary tree depths, multi-type tree depths, and quadtree depths of the neighboring blocks and the current blocks, as well as the widths, heights, sizes and split shapes of the current block and the neighboring blocks.

Figure 1:
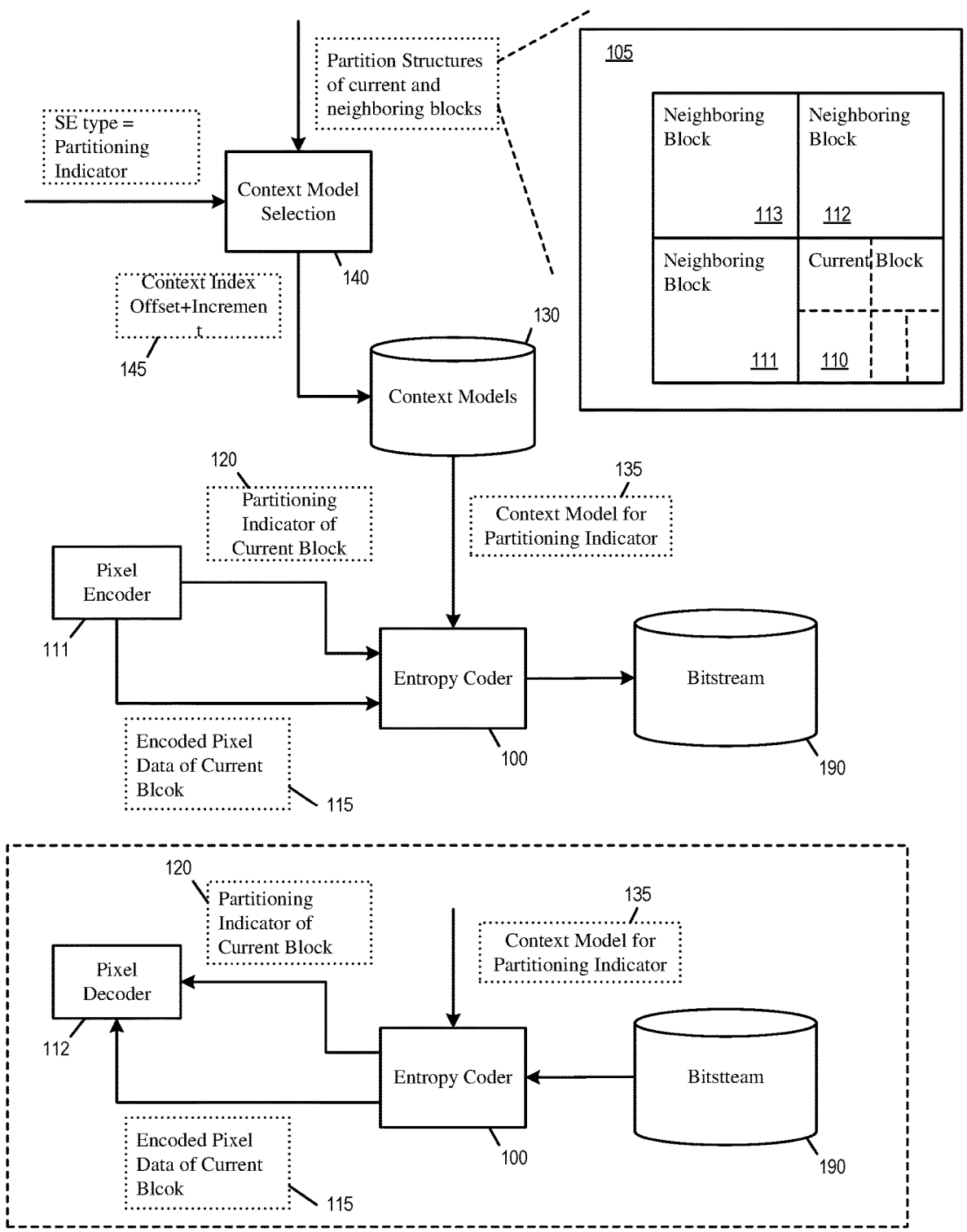
FIG. 1 conceptually illustrates an entropy coder that selects a context model for entropy coding a partitioning indicator of a current block of pixels based on partitioning structures of the current block and its neighboring blocks.

FIG. 1 conceptually illustrates an entropy coder 100 that selects a context model for entropy coding a partitioning indicator of a current block of pixels based on partitioning structures of the current block and its neighboring blocks. The figure illustrates a block of pixels 110 of an image 105. The image 105 may be a still image or a video picture of a video sequence. The block of pixels 110 is the current block of pixels being coded. The current block 110 may be a CTU or a CU. The current block 110 has several neighboring blocks 111-113 in the image 105. The neighbor blocks 111-113 may include blocks that are coded prior to the current block 110. Some of the neighboring blocks 111-113 are to the left and top of the current block 110. The neighboring blocks 111-113 may also include other blocks that are spatially near the current block 110.

When encoding or decoding the current block 110, the current block may be partitioned or split into partitioned units for coding purposes. The partitioned units may have different split shapes and orientations. Some of the partitioned units may be further split into partitioned units of greater split depths. The split shapes and split depths of the current block are determined by the partitioning structure of the current block. The partitioning structure of a block is represented by one or more partitioning indicators associated with the block. Section I below describes various partitioning structures and Section II below describes various partitioning indicators. In some embodiments, the partitioning indicators are in the format of syntax elements of a standard-compliant video bitstream. In the figure, the partitioning structure of the current block 110 is at least partly indicated by a partitioning indicator 120. There may be more than one partitioning indicator associated with the current block 110.

As illustrated, the entropy coder 100 is coding the current block of pixels 110. The entropy coder 100 may be an entropy encoder that receives encoded pixel data 115 (e.g., quantized DCT coefficients, flags) of the current block 110 from a pixel encoder 111 and generates corresponding entropy encoded bits as part of a bitstream 190. The entropy coder 100 may be an entropy decoder that receives entropy encoded bits of the bitstream 190 and generates corresponding entropy decoded bits as encoded pixel data 115 of the current block 110 for a pixel decoder 112. The partitioning indicator 120 of the current block 110 is entropy encoded or decoded as a syntax element along with the encoded pixel data 115 of the current block 110.

The entropy coder 100 performs CABAC coding, which uses different context models 130 for different types of syntax elements. A context model selection module 140 selects a context model 135 for the entropy coder 100 by providing a context index 145, which includes a context index offset and a context index increment (also referred to as context selection increment). The context model selection module 140 determines the context index offset based on the syntax element type (SE type) currently being coded. When the syntax element type indicates that the current syntax element being coded is a partitioning indicator, the context model selection module 140 determines the context index increment (also denoted as ctxInc) based on the partitioning structure (e.g., split shapes and split depths) of the current block 110 and/or of the neighboring blocks 111-113. Section III below describes selection of context models for entropy coding partitioning indicators.

I. Partitioning Structures

A binary tree (BT) partitioning structure may be used to represent the partitioning of a block into multiple smaller blocks by binary tree split (or binary split). In the binary tree split structure, a block can be recursively split into two smaller blocks. There are several types of binary tree split, including symmetric horizontal and vertical splits. For a block of size M×N, horizontal split produces two partitioned units of size M×N/2, and vertical split produces two partitioned units of size M/2×N. The binary tree split process can be recursively applied until the size (width or height) of the partitioned unit reaches the minimum block size (width or height). The minimum block size can be defined in a high-level syntax set such as SPS. Since the binary tree has two split types (i.e., horizontal and vertical), minimum block width and height are both indicated.

Figure 2:
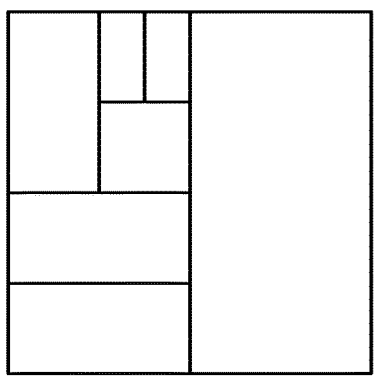
FIG. 2 conceptually illustrates partitioning of a coding unit (CU) by binary tree split.
Figure 2:
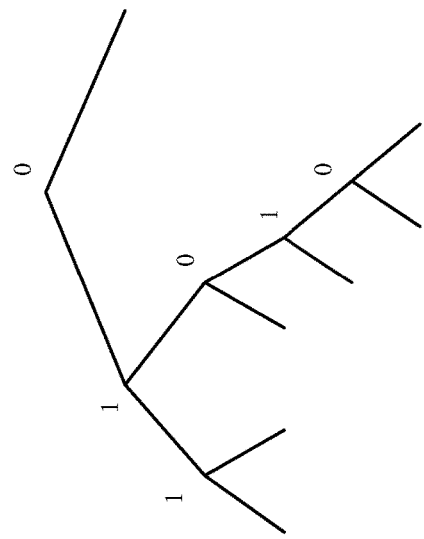

Non-horizontal split is implicit when the split would result in a block height smaller than the indicated minimum. Non-vertical split is implicit when the split would result in a block width smaller than the indicated minimum. FIG. 2 conceptually illustrates partitioning of a CU by binary tree split. The figure illustrates an example of block partitioning (left) and its corresponding binary tree (right). For each split (i.e., non-leaf) node of the binary tree, one flag is signaled to indicate which split type (horizontal or vertical) is used, "0" for horizontal split and "1" for vertical split.

Figure 3:
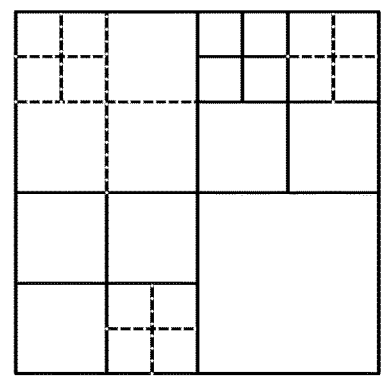
FIG. 3 illustrates a coding tree built on a quadtree (QT) split structure that represents the partitioning of a coding tree unit (CTU) into CUs.
Figure 3:
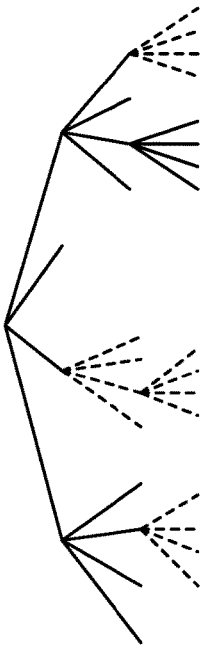

A block of pixels such as a CTU can also be partitioned into multiple non-overlapped coding units (CUs) to adapt to various local motion and texture characteristics. A coding tree built on a quadtree (QT) split structure is employed to represent the CU partitions divided from a CTU. Consider the CTU of size M×M pixel samples, where M is one of the values 64, 32, and 16. The CTU can be either comprised of a single unit of the same size M×M, or split into four smaller units with equal size M/2×M/2. The CTU is associated with the root node of a coding tree and the four M/2×M/2 units are the child quadtree nodes split from the root node of a coding tree. Each of the four quadtree nodes may become parent node for another split into four child nodes with further reduced size (by half in each spatial dimension). The quadtree split can be recursively applied until a leaf is reached. The leaf nodes of a coding tree are associated with the CUs. FIG. 3 illustrates a coding tree built on a quadtree (QT) split structure that represents the partitioning of a CTU into CUs. The minimum and maximum CU sizes are specified in the sequence parameter set (SPS).

In some embodiments, a quadtree plus binary tree (QTBT) structure is used for partitioning the CUs into smaller CUs. Each CTU may contain one CU or be partitioned into multiple smaller CUs using the quadtree split structure. The quadtree split can be recursively applied to the CUs until the current CU size reaches the minimum quadtree leaf node size. If the current quadtree block is not larger than the maximum binary tree root node size, it can be further partitioned using the binary tree split structure. The binary tree split can be recursively applied until the current CU size (width or height) reaches the minimum binary tree leaf node size (width or height) or the until the current binary tree depth reaches the maximum binary tree depth. There are two split types, symmetric horizontal split and symmetric vertical split. The binary tree leaf nodes are associated with the CUs.

Figure 4:
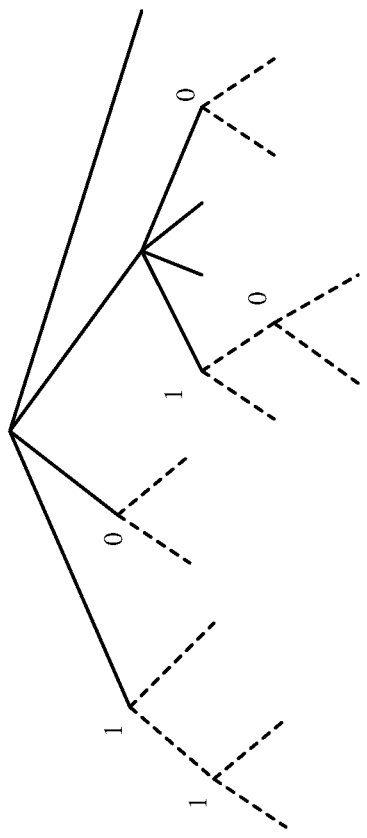
FIG. 4 conceptually illustrates partitioning a CU by both quadtree split and binary tree split.
Figure 4:
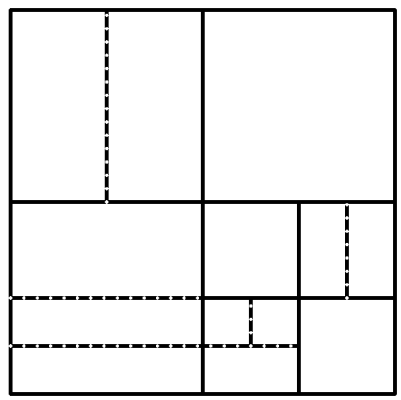

FIG. 4 conceptually illustrates partitioning a CU by both quadtree split and binary tree split. The figure illustrates an example of block partitioning (left) and its corresponding QTBT (right). The solid lines indicate quadtree split and the dotted lines indicate binary tree split. For each split (i.e., non-leaf) node of the binary tree, one flag is signaled to indicate which split type (horizontal or vertical) is used. "0" indicates horizontal split and "1" indicates vertical split. Minimum quadtree leaf node size, maximum binary tree root node size, minimum binary tree leaf node width and height, and maximum binary tree depth are indicated in high-level syntax sets.

Figure 5:
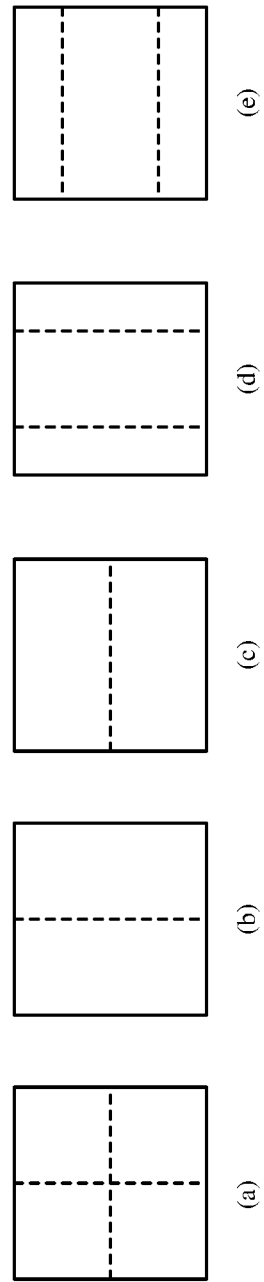
FIG. 5 illustrates several split types or modes for partitioning a CTU in an MTT structure.

In a multi-type tree (MTT) structure, horizontal and vertical center-side ternary trees are further added to the QTBT structure for splitting the CUs. A CU can be further split into smaller CUs using one of several split types. FIG. 5 illustrates several split types or modes (a)-(e) for partitioning a CTU in an MTT structure. Split types (a) (b) and (c) correspond to quad-tree split, vertical binary tree split, and horizontal binary tree split, respectively. Split types (d) and (e) are referred to as ternary-tree split types that divide a block into three smaller blocks. The three smaller blocks from the ternary-tree split have reduced sizes in one spatial dimension while keeping the same size in the other spatial dimension. The binary tree depth of a current CU btDepthC in a MTT structure is defined as follows:

$$btDepthC = \log 2((widthR * heightR)/(widthC * heightC)),$$

where widthC and heightC respectively represent the width and the height of the current CU, and widthR and heightR respectively represent the width and the height of the corresponding MTT root node, and the function log 2(x) is a the base-2 logarithm of x.

II. Signaling of Partitioning Structures

The partitioning structure of a block of pixels is signaled by partitioning indicators associated with the block. The partitioning indicators indicate whether and how the block is partitioned. For example, for a given block of size M×N, a partitioning indicator bt_split_flag may be signaled as a syntax element to indicate whether to split a block into two smaller blocks. If the flag is true, another partitioning indicator bt_split_mode (also referred to as split_dir) is signaled as a syntax element to indicate which split direction or orientation is used (i.e., horizontal or vertical). In some embodiments, a coding tree unit (CTU) can be partitioned into one or multiple smaller size CUs by a quadtree with nested multi-type tree using binary and ternary split. A partitioning indicator qt_split_flag (also referred to as qt_split_cu_flag) is signaled as a syntax element to indicate whether a coding unit is split into coding units with half horizontal and vertical sizes. A partitioning indicator mtt_split_flag (also referred to as mtt_split_cu_flag) is signaled as a syntax element to indicate whether a coding unit is split into CUs by one of several multi-type tree spliting modes, including horizontal binary tree split, vertical binary tree split, horizontal ternary tree split, and vertical ternary tree split, as illustrated in FIG. 5 above. A partitioning indicator mtt_split_cu_vertical_flag (also referred to as mtt_split_vertical or split_dir) is signaled as a syntax element to indicate whether a CU is split horizontally or vertically. A partitioning indicator mtt_split_binary_flag (also referred to as mtt_ split_cu_binary_flag) is signaled as a syntax element to indicate whether a CU is partitioned by binary or ternary split.

In some embodiments, if the partitioning indicator bt_split_flag or mtt_split_flag is true, a partitioning indicator split_dir (also referred to as mtt_split_vertical) is next coded to indicate the split/partitioning direction (horizontal or vertical) to be adopted by the current block.

Figure 6:
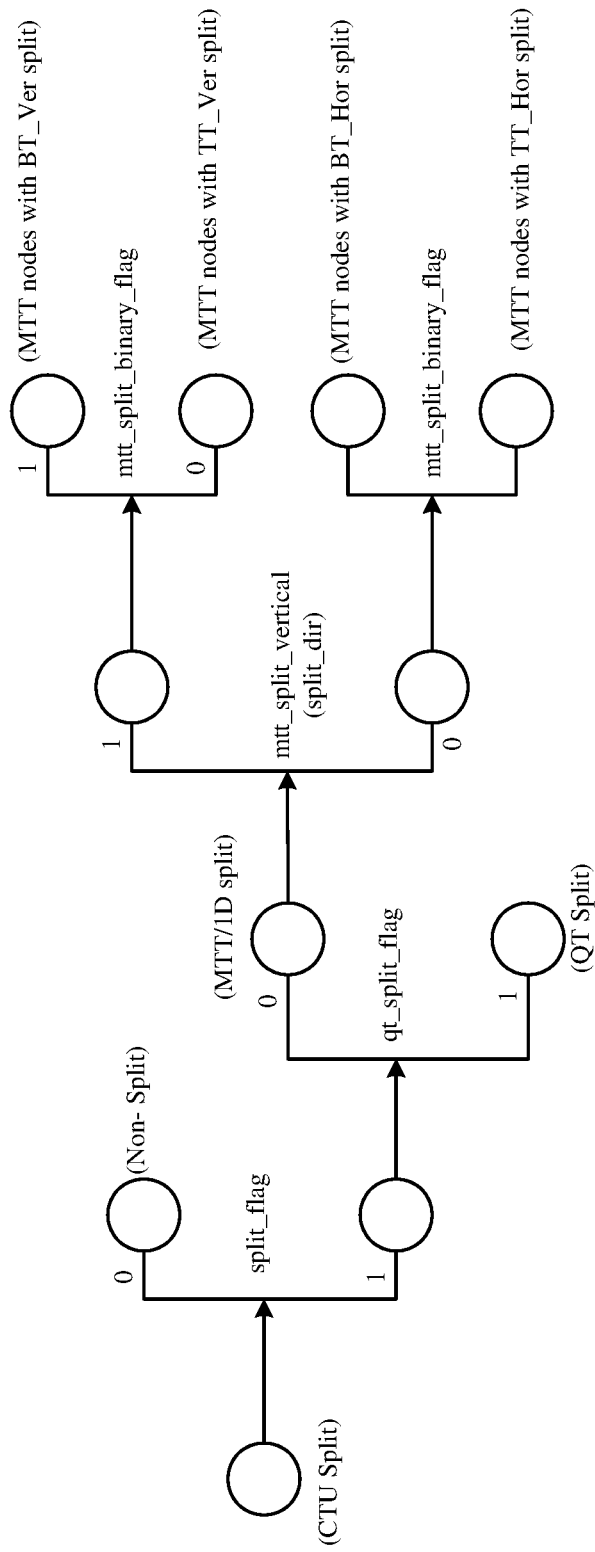
FIG. 6 illustrates a decision tree for signaling the partition structure of a CTU in some embodiments.

FIG. 6 illustrates a decision tree for signaling the partition structure of a CTU in some embodiments. As illustrated, a partitioning indicator split_flag is initially used to signal whether to split the CTU (split_flag is '1') or not split the CTU (split_flag is '0'). If the decision is to split the CTU, the partitioning indicator qt_split_flag is used to determine whether to split the CTU by quad tree (QT split) or by multi-type tree (MTT split or 1D split). If the decision is to split the CTU by QT split (qt_split_flag is '1'), the video coder split the CTU by quad-tree. If the decision is to split the CTU by MTT split (qt_split_flag is '0'), the video coder uses the partitioning indicator mtt_split_vertical to indicate whether to split the CTU horizontally or vertically, and uses the partitioning indicator mtt_split_binary_flag to determine whether to split the CTU by binary tree split or ternary split.

Figure 7:
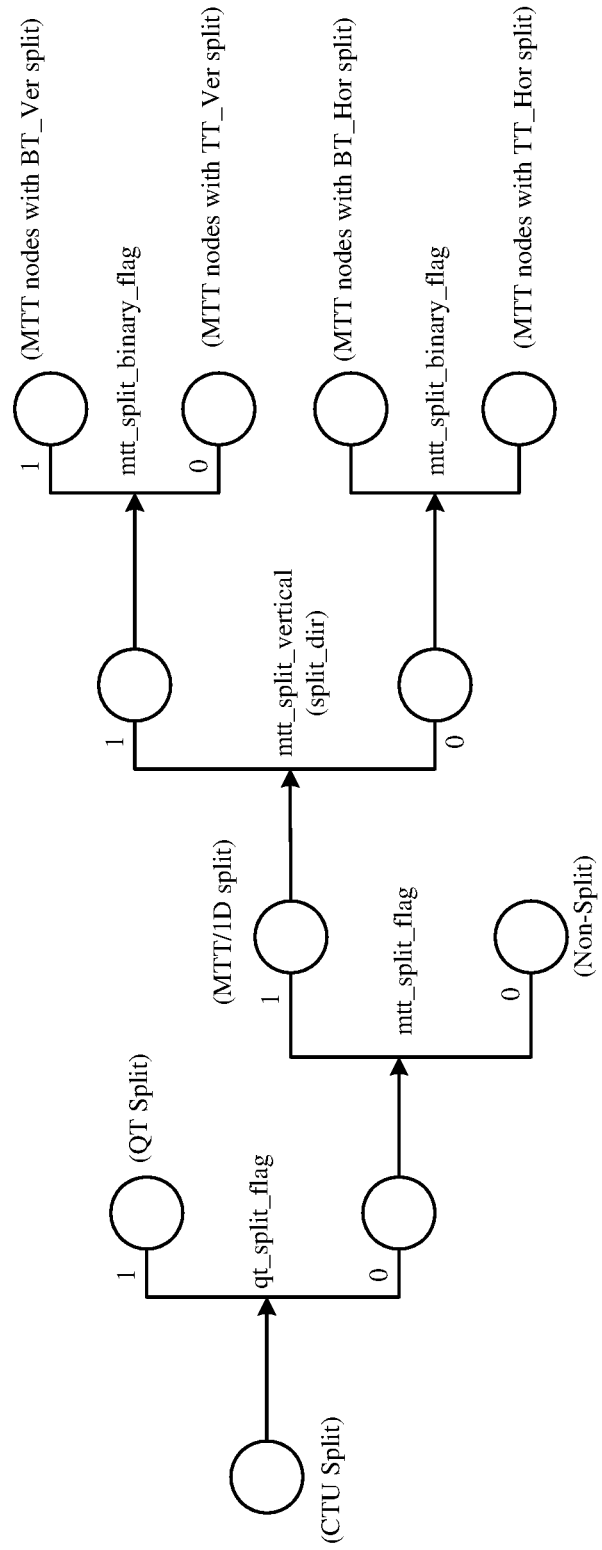
FIG. 7 illustrates an alternative decision tree for signaling the partition structure of a CTU in some embodiments.

FIG. 7 illustrates an alternative decision tree for signaling the partition structure of a CTU in some embodiments. As illustrated, the partitioning indicator qt_split_flag is used to indicate whether the CTU is to be split by quad tree. If the decision is to split the CTU by QT split (qt_split_flag is '1'), the video coder split the CTU by quad-tree. If the decision is to not split the CTU by QT split (qt_split_flag is '0'), the partitioning indicator mtt_split_flag is used to indicate whether the CTU is to be split by MTT split (mtt_split_flag is '1') or not split at all (mtt_split_flag is '0'). If the decision is to split the CTU by MTT split, the video coder uses the partitioning indicator mtt_split_vertical to determine whether to split the CTU horizontally or vertically, and uses the mtt_split_binary_flag to determine whether to split the CTU by binary or ternary split.

III. Context Modeling for Partitioning Indicators

In some embodiments, the context modeling for entropy coding a partitioning indicator of the partitioning structure of a block is determined based on split depths or split shapes of the current block and its neighboring blocks. For example, the selection of a context model for entropy coding the syntax element bt_split_flag or mtt_split_flag is determined based on the number of the neighboring blocks (which include the block to the top and the block to the left of the current block) that have greater combined QT plus BT/MTT depths (also referred to as combined QTBT depths) than the current block. The combined QT plus BT/MTT depth of a block is defined to be equal to the sum of the block's QT depth scaled by 2 plus the block's BT/MTT depth. Tables 1 is a mapping table for the context index increment of the partitioning indicator bt_split_flag or mtt_split_flag. The mapping is from the number of neighboring blocks having greater combined QTBT depths to the context index increment:

TABLE 1

| | | | |
|---|---|---|---|
| ctxInc of bt_split_flag or mtt_split_flag | 0 | 1 | 2 |
| Number of neighboring CUs with greater combined QTBT depths than the current block | 0 | 1 | 2 |

In some embodiments, the context modeling for entropy coding the syntax element split_dir is determined based on the shape of the current block. Table 2 is a mapping table for the context index increment of the partitioning indicator split_dir. The mapping is from the shape of the current block to the context index increment.

TABLE 2

| | | | |
|---|---|---|---|
| ctxInc for split_dir | 0 | 1 | 2 |
| block shape | width = height | width > height | width < height |

In some embodiments, the determination of context modeling is further based on the BT or MTT depth (or split depth) of the current block. Table 3 is an alternative mapping table for context index increment of the partitioning indicator bt_split_flag or mtt_split_flag. The mapping is from the binary tree depth of the current block and the number of neighboring blocks having greater combined QTBT depths than the current block to the context index increment.

TABLE 3

| binary tree depth | 0 | | | 1 | | | 2 | | | >2 | | |
|---|---|---|---|---|---|---|---|---|---|---|---|---|
| ctxInc for bt_split_flag/mtt_split_flag | 0 | 1 | 6 | 7 | 8 | 5 | 6 | 7 | 8 | 9 | 10 | 11 |
| number of neighboring CUs with greater combined QTBT depth | 0 | 1 | 0 | 1 | 2 | 2 | 0 | 1 | 2 | 0 | 1 | 2 |

Table 4 is an alternative mapping table for the context index increment of the partitioning indicator split_dir. "W" and "H" denotes the width and height of the current block. The mapping is from the binary tree depth of the current block and the shape of the current block to the context index increment.

TABLE 4

| binary tree depth | 0 | | | 1 | | | 2 | | | >2 | | |
|---|---|---|---|---|---|---|---|---|---|---|---|---|
| ctxInc for split_dir | 0 | 2 | 5 | 1 | 3 | 6 | 1 | 4 | 7 | | | |
| block shape | W = H | W > H | W < H | W = H | W > H | W < H | W = H | W > H | W < H | | | |

In some embodiments, the video coder entropy codes the binary value of the CU quadtree split flag (qt_split_flag, corresponding to the syntax element split_cu_flag in HEVC) resulting from a quadtree or QTBT partitioning structure. The context modeling scheme is determined based on the number of the neighboring CUs having greater quadtree depth than the current CU and is further conditioned on the quadtree depth of the current CU for certain neighboring configurations. For example, the context index increment ctxInc for coding the partitioning indicator qt_split_flag of the current CU may be determined by $$ctxInc=(d<T0?0:(d>T1?(T1-T0+1):(d-T0)))*(N+1)+n, \qquad \text{Eq. (1)}$$

where n is the number of the neighboring CUs having greater QT depth than the current CU, N is the maximum number of the neighboring CUs, d is the quadtree depth of the current CU, and T0 and T1 are some pre-determined depth threshold values.

In some embodiments, the total number of contexts for entropy coding is reduced, and the context index increment ctxInc for coding the partitioning indicator qt_split_flag of the current CU is determined by $$ctxInc=(n<N)?n:((d<T0?0:(d>T1?(T1-T0+1):(d-T0)))+N), \qquad \text{Eq. (2)}$$

where n is the number of the neighboring CUs having QT depths greater than the current CU, N is the maximum number of the neighboring CUs, d is the quadtree depth of the current CU, and T0 and T1 are some pre-determined quadtree depth threshold values.

An example mapping table for context index increment based on Equation (2) is provided in Table 5, where context modeling is further conditioned on the quadtree depth of the current CU with threshold values T0 and T1 being equal to 0 and 2, respectively, when both neighboring CUs (N equal to 2) correspond to greater quadtree depths.

TABLE 5

| quadtree depth of the current CU | 0 | | | 1 | | | 2 | | | >2 | |
|---|---|---|---|---|---|---|---|---|---|---|---|
| ctxInc | 0 | 1 | 2 | 0 | 1 | 3 | 0 | 1 | 4 | 0 | 1 | 5 |
| of neighboring CU's with greater QT depth | 0 | 1 | 2 | 0 | 1 | 2 | 0 | 1 | 2 | 0 | 1 | 2 |

In some embodiments, a video coder employs a partitioning structure for splitting a CTU into one or multiple smaller size CUs by a quadtree combined with the nested multi-type tree using binary and ternary split or the nested binary tree using only binary tree split. Such a partitioning structure is indicated by the partitioning indicator qt_split_flag, mtt_split_flag, or bt_split_flag.

The context index increment ctxIncQt for entropy coding the partition indicator qt_split_flag can be jointly conditioned on the split depth (e.g., combined QTBT depth) of the current CU and the split depths of two spatial neighboring CUs, given by $$ctxIncQt=(((qtDepthC<qtDepthA)?1:0)+((qtDepthC<qtDepthL)?1:0))+(3*(qtDepthC<T1?0:1)), \qquad \text{Eq. (3)}$$

where qtDepthC, qtDepthA, and qtDepthL represent the quadtree depths of the current CU, above neighboring CU and left neighboring CU, respectively, and T1 is a threshold value. In some embodiments, T1 is set to 2.

The selected context index increment ctxIncMtt for entropy coding the partitioning indicator split_flag, mtt_split_flag or bt_split_flag can be jointly conditioned on the widths, heights and depths of the current CU and neighboring CUs, given by $$ctxIncMtt=(((widthC>widthA)?1:0)+(heightC>heightL)?1:0))+(3*(btDepthC<T2?0:1)), \qquad \text{Eq. (4)}$$

where widthC and widthA represent the widths of the current CU and the above neighboring CU, respectively, and heightC and heightL represent the heights of the current CU and the left neighboring CU, respectively, and btDepthC represents the BT depth of the current CU, and T2 is a threshold value. In one preferred embodiment, T2 is set to 2. In some alternative embodiments, context modeling may be conditioned on the MTT depth of the current CU, given by $$ctxIncMtt=(((widthC>widthA)?1:0)+(heightC>heightL)?1:0))+(3*(mttDepthC<T2?0:1)), \qquad \text{Eq. (5)}$$

where mttDepthC is the MTT depth of the current CU.

IV. Example Video Encoder

Figure 8:
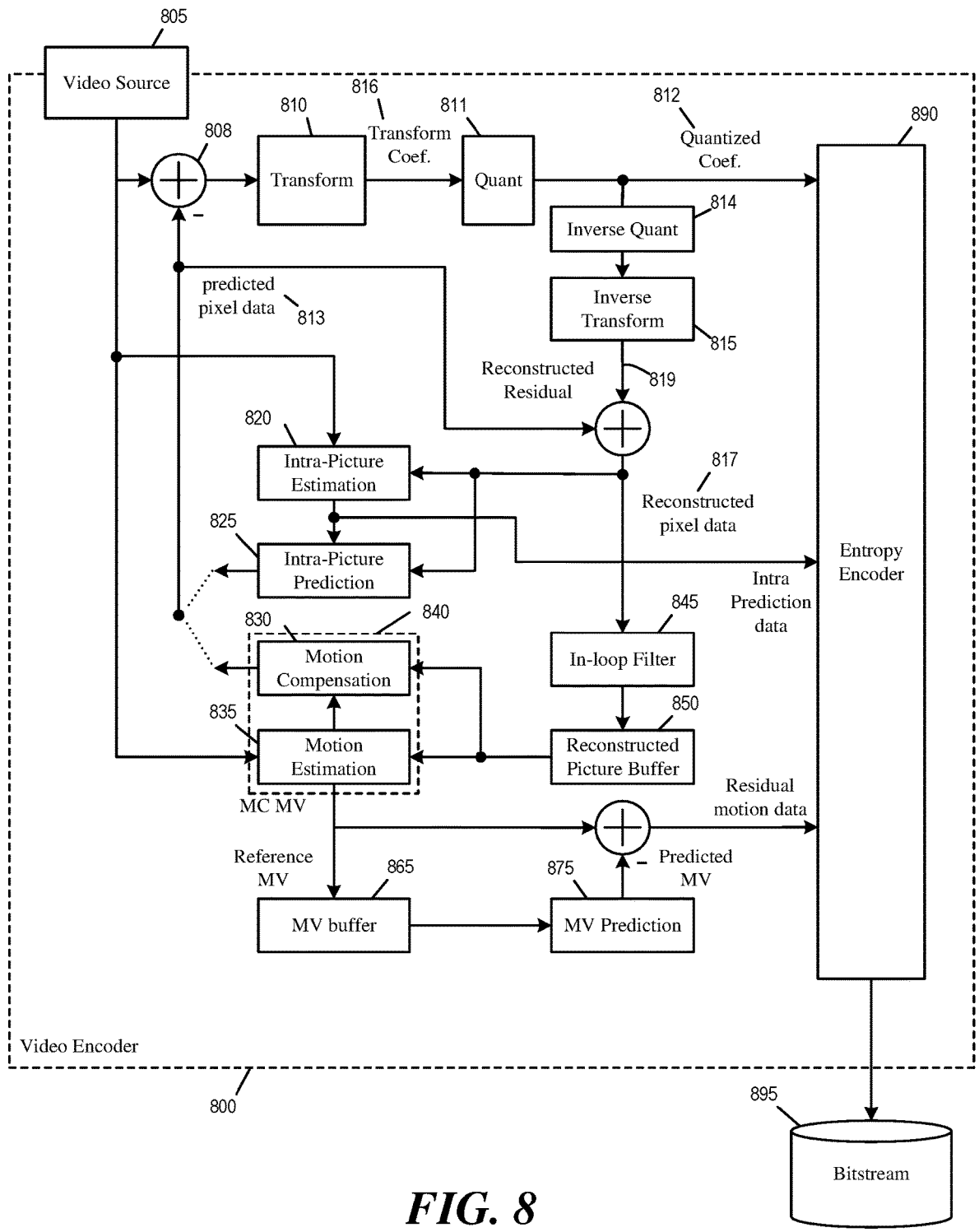
FIG. 8 illustrates an example video encoder that entropy encodes a partitioning indicator of a current block by using partitioning structures of the current block and its neighboring blocks to perform context modeling.

FIG. 8 illustrates an example video encoder 800 that entropy encodes a partitioning indicator of a current block by using partitioning structures of the current block and its neighboring blocks to perform context modeling. As illustrated, the video encoder 800 receives input video signal from a video source 805 and encodes the signal into bitstream 895. The video encoder 800 has several components or modules for encoding the signal from the video source 805, at least including some components selected from a transform module 810, a quantization module 811, an inverse quantization module 814, an inverse transform module 815, an intra-picture estimation module 820, an intra-prediction module 825, a motion compensation module 830, a motion estimation module 835, an in-loop filter 845, a reconstructed picture buffer 850, a MV buffer 865, and a MV prediction module 875, and an entropy encoder 890. The motion compensation module 830 and the motion estimation module 835 are part of an inter-prediction module 840.

In some embodiments, the modules 810-890 are modules of software instructions being executed by one or more processing units (e.g., a processor) of a computing device or electronic apparatus. In some embodiments, the modules 810-890 are modules of hardware circuits implemented by one or more integrated circuits (ICs) of an electronic apparatus. Though the modules 810-890 are illustrated as being separate modules, some of the modules can be combined into a single module.

The video source 805 provides a raw video signal that presents pixel data of each video frame without compression. A subtractor 808 computes the difference between the raw video pixel data of the video source 805 and the predicted pixel data 813 from the motion compensation module 830 or intra-prediction module 825. The transform module 810 converts the difference (or the residual pixel data or residual signal 809) into transform coefficients by performing a transforming operation (e.g., Discrete Cosine Transform (DCT), Discrete Sine Transform (DST) or any other transform operation). The quantization module 811 quantizes the transform coefficients into quantized data (or quantized coefficients) 812, which is encoded into the bitstream 895 by the entropy encoder 890.

The inverse quantization module 814 de-quantizes the quantized data (or quantized coefficients) 812 to obtain transform coefficients, and the inverse transform module 815 performs inverse transform on the transform coefficients to produce reconstructed residual 819. The reconstructed residual 819 is added with the predicted pixel data 813 to produce reconstructed pixel data 817. In some embodiments, the reconstructed pixel data 817 is temporarily stored in a line buffer (not illustrated) for intra-picture prediction and spatial MV prediction. The reconstructed pixels are filtered by the in-loop filter 845 and stored in the reconstructed picture buffer 850. In some embodiments, the reconstructed picture buffer 850 is a storage external to the video encoder 800. In some embodiments, the reconstructed picture buffer 850 is a storage internal to the video encoder 800.

The intra-picture estimation module 820 performs intra-prediction based on the reconstructed pixel data 817 to produce intra prediction data. The intra-prediction data is provided to the entropy encoder 890 to be encoded into bitstream 895. The intra-prediction data is also used by the intra-prediction module 825 to produce the predicted pixel data 813.

The motion estimation module 835 performs inter-prediction by producing MVs to reference pixel data of previously decoded frames stored in the reconstructed picture buffer 850. These MVs are provided to the motion compensation module 830 to produce predicted pixel data.

Instead of encoding the complete actual MVs in the bitstream, the video encoder 800 uses MV prediction to generate predicted MVs, and the difference between the MVs used for motion compensation and the predicted MVs is encoded as residual motion data and stored in the bitstream 895.

The MV prediction module 875 generates the predicted MVs based on reference MVs that were generated for encoding previously video frames, i.e., the motion compensation MVs that were used to perform motion compensation. The MV prediction module 875 retrieves reference MVs from previous video frames from the MV buffer 865. The video encoder 800 stores the MVs generated for the current video frame in the MV buffer 865 as reference MVs for generating predicted MVs.

The MV prediction module 875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 895 by the entropy encoder 890.

The entropy encoder 890 encodes various parameters and data into the bitstream 895 by using entropy-coding techniques such as context-adaptive binary arithmetic coding (CABAC) or Huffman encoding. The entropy encoder 890 encodes various header elements, flags, along with the quantized transform data 812, and the residual motion data as syntax elements into the bitstream 895. The bitstream 895 is in turn stored in a storage device or transmitted to a decoder over a communications medium such as a network.

The in-loop filter 845 performs filtering or smoothing operations on the reconstructed pixel data 817 to reduce the artifacts of coding, particularly at boundaries of pixel blocks. In some embodiments, the filtering operation performed includes sample adaptive offset (SAO). In some embodiments, the filtering operations include adaptive loop filter (ALF).

Figure 9:
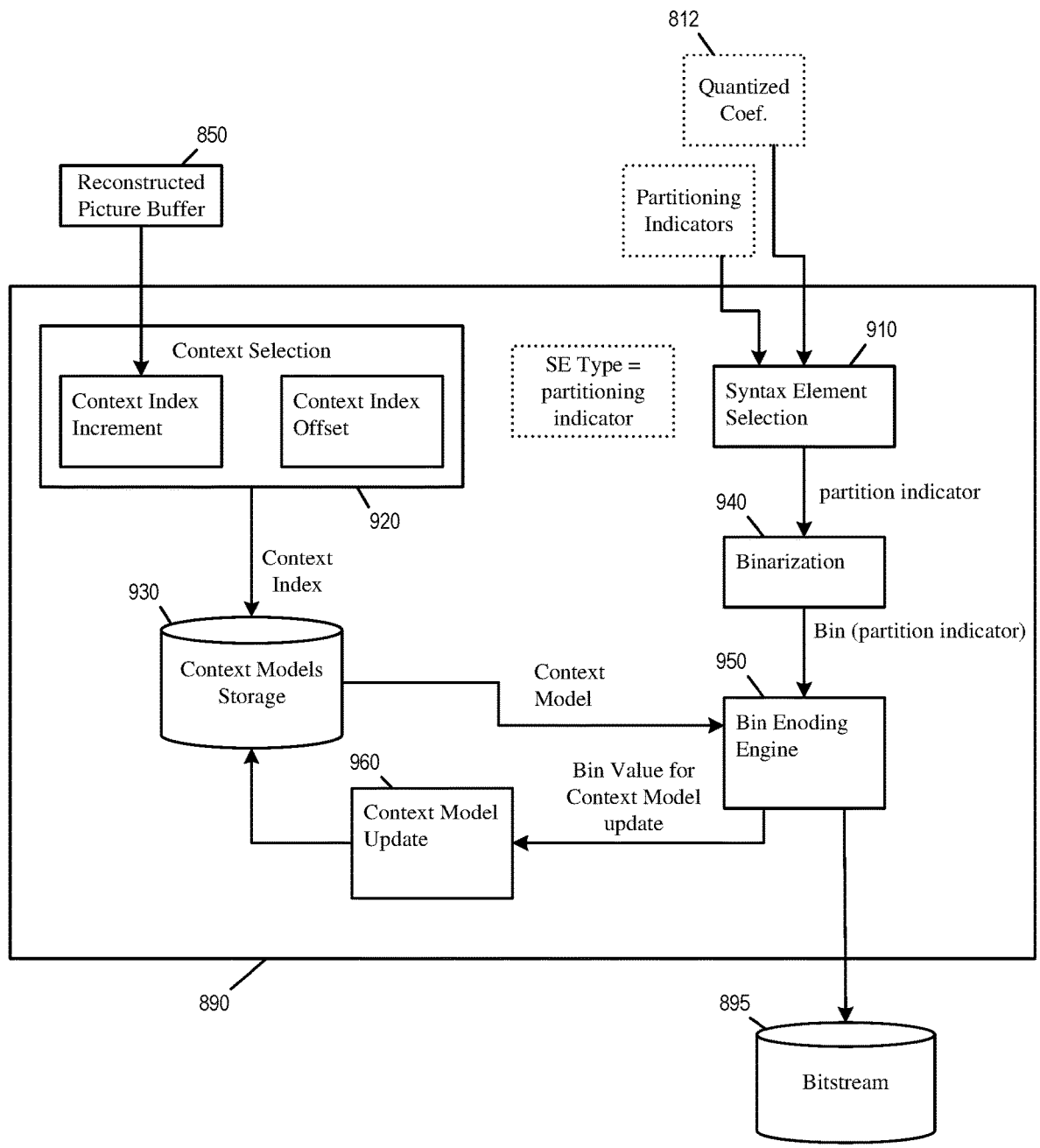
FIG. 9 illustrates portions of the video encoder that selects a context model for entropy coding a partitioning indicator of a current block of pixels based on partitioning structures of the current block and its neighboring blocks.

FIG. 9 illustrates portions of the video encoder 800 that selects a context model for entropy coding a partitioning indicator of a current block of pixels based on partitioning structures of the current block and its neighboring blocks. Specifically, the figure illustrates the components of the entropy encoder 890 when entropy encoding the partitioning indicator of the current block.

As illustrated, the entropy encoder 890 includes a syntax element selection module 910, a context selection module 920, a context models storage 930, a binarization module 940, a bin encoding engine 950, and a context model update module 960.

The syntax element selection module 910 selects data to be encoded as syntax elements in the bitstream 895 from various sources of the video encoder 800, including partitioning indicators. The data selected as syntax element is passed to the binarization module 940, which convert the selected data into bins. The bin encoding engine 950 in turn performs binary arithmetic coding to convert the bins into binary arithmetic codes to be included in the bitstream 895. The binary arithmetic coding operation relies on context modeling, which provides a context model based on probabilities specific to the type of syntax element being coded. The different context models of the different types of syntax elements are stored at the context models storage 930. The context model update module 960 updates the probabilities of the various context models based on the bin values that are processed at the bin encoding engine 950.

The context model being used by the bin encoding engine 950 is retrieved from the context models storage 930 based on a context index provided by the context selection module 920. The context index is based on a context index offset and a context index increment. When the syntax element being coded is a partitioning indicator, the context selection module 920 sets the context index offset and context index increment to correspond to that particular partitioning indicator. The context selection module 920 may set the context index increment (ctxInc) based on the partitioning structures of the current block and the neighboring blocks. The partition structures of the current block and of the neighboring blocks may be retrieved from the reconstructed picture buffer 850. For example, widths and heights of the current block and of the neighboring blocks may be used to determine the ctxInc for mtt_split_flag according to Eq. (4). Binary tree depth and block shape of the current block may be used to determine the ctxInc for split_dir according to Table 4. The number of the neighboring blocks corresponding to greater quadtree depth than the current block may be used to determine the ctxInc for qt_split_flag according to Eq. (1).

Figure 10:
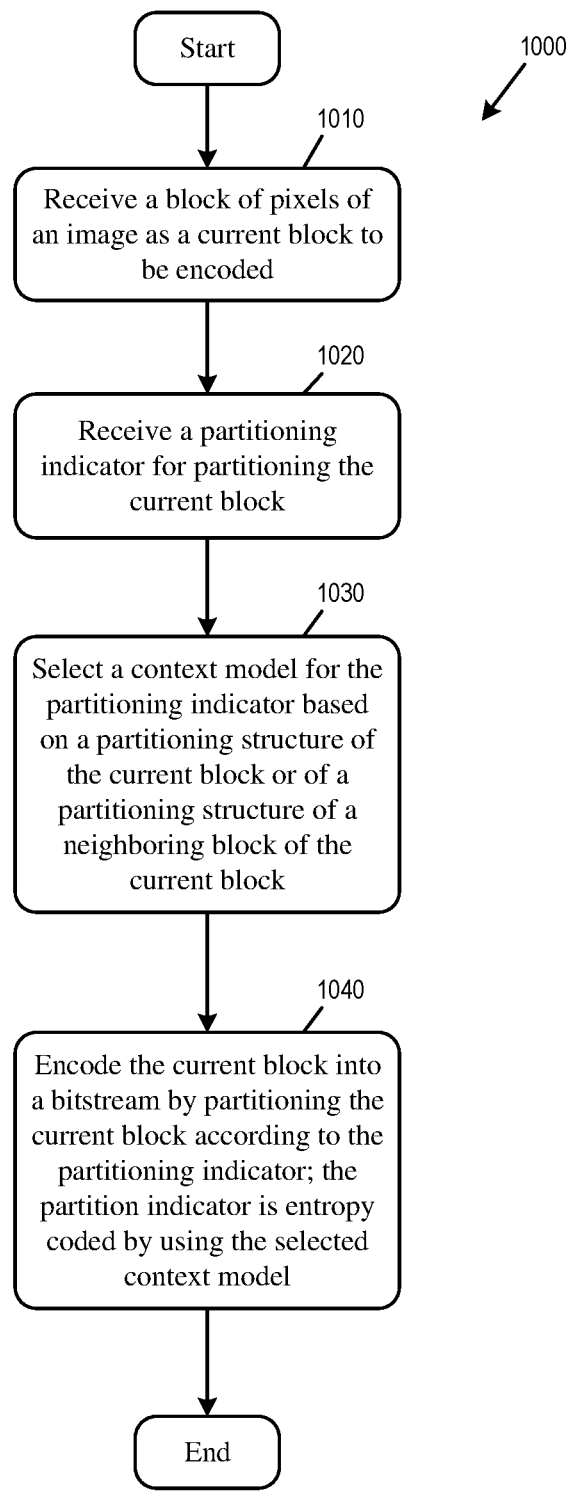
FIG. 10 conceptually illustrates a process for encoding a current block of pixels in which the context modeling of a partitioning indicator is conditioned upon the partitioning structures of the current block and its neighboring blocks.

FIG. 10 conceptually illustrates a process 1000 for encoding a current block of pixels in which the context modeling of a partitioning indicator is conditioned upon the partitioning structures of the current block and its neighboring blocks. In some embodiments, one or more processing units (e.g., a processor) of a computing device implementing the video encoder 800 performs the process 1000 by executing instructions stored in a computer readable medium. In some embodiments, an electronic apparatus implementing the video encoder 800 performs the process 1000.

The video encoder receives (at step 1010) a block of pixels of an image as a current block to be encoded. The block of pixels may be a CU or a CTU. The current block may have neighboring blocks in the image that are already encoded. Some of the neighboring blocks may be partitioned in quad-tree structure or multi-type tree structure during encoding.

The video encoder receives (at step 1020) a partitioning indicator for partitioning the current block. The partitioning indicator may be a flag for binary tree split (e.g., bt_split_flag), multi-type split (e.g., mtt_split_flag), quad-tree split (e.g., qt_split_flag), split orientation (e.g., split_dir), or a partitioning indicator of another type. The video encoder may receive the partitioning indicator from a rate control process that determines encoding modes based on the content of the image.

The video encoder selects (at step 1030) a context model for the partitioning indicator based on a partitioning structure of the current block or a partitioning structure of a neighboring block. The video encoder determines a context index for selecting a context model by setting the context index increment based on factors such as the split depth of the current block, the split depths of the neighboring blocks, shape of the current block, the shapes of the neighboring blocks, shapes and orientations of the partitioned units of the current block or the neighboring block (e.g., square due to quad tree partition, horizontal rectangle or vertical rectangle due to binary partition or ternary partition, etc.). Section III above describes determining the context index increment of various types partition indicators.

The video encoder encodes (at step 1040) the current block as part of a bitstream by partitioning the current block according to the partitioning indicator. For example, if the partition indicator is qt_split_flag that indicates that the current block is to be partitioned by quadtree, the video encoder splits the current block into four partitioned units and encode the four partitioned units separately. As part of the encoding of the current block, the partitioning indicator is entropy coded by using the context model selected at step 1030.

V. Example Video Decoder

Figure 11:
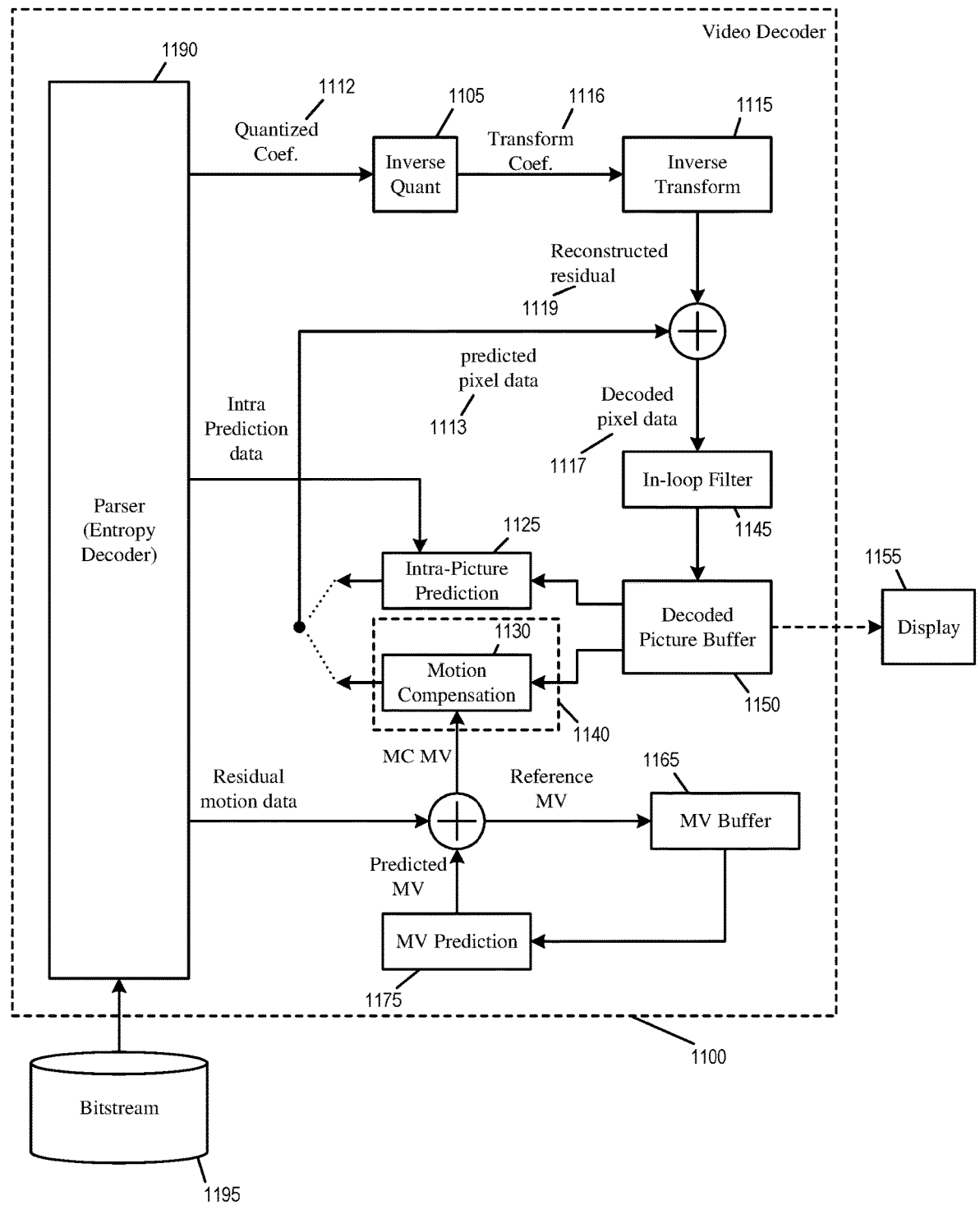
FIG. 11 illustrates an example video decoder that entropy decodes a partitioning indicator of a current block by using partitioning structures of the current block and its neighboring blocks to perform context modeling.

FIG. 11 illustrates an example video decoder 1100 that entropy decodes a partitioning indicator of a current block by using partitioning structures of the current block and its neighboring blocks to perform context modeling. The video decoder 1100 has several components or modules for decoding a bitstream 1195, including some components selected from an inverse quantization module 1105, an inverse transform module 1115, an intra-prediction module 1125, a motion compensation module 1130, an in-loop filter 1145, a decoded picture buffer 1150, a MV buffer 1165, a MV prediction module 1175, and a parser 1190. The motion compensation module 1130 is part of an inter-prediction module 1140.

In some embodiments, the modules 1110-1190 are modules of software instructions being executed by one or more processing units (e.g., a processor) of a computing device. In some embodiments, the modules 1110-1190 are modules of hardware circuits implemented by one or more ICs of an electronic apparatus. Though the modules 1110-1190 are illustrated as being separate modules, some of the modules can be combined into a single module.

The parser 1190 (or entropy decoder) receives the bitstream 1195 and performs initial parsing according to the syntax defined by a video-coding or image-coding standard. The parsed syntax element includes various header elements, flags, as well as quantized data (or quantized coefficients) 1112. The parser 1190 parses out the various syntax elements by using entropy-coding techniques such as context-adaptive binary arithmetic coding (CABAC) or Huffman coding.

The inverse quantization module 1105 de-quantizes the quantized data (or quantized coefficients) 1112 to obtain transform coefficients, and the inverse transform module 1115 performs inverse transform on the transform coefficients 1116 to produce reconstructed residual signal 1119. The reconstructed residual signal 1119 is added with predicted pixel data 1113 from the intra-prediction module 1125 or the motion compensation module 1130 to produce decoded pixel data 1117. The decoded pixels data are filtered by the in-loop filter 1145 and stored in the decoded picture buffer 1150. In some embodiments, the decoded picture buffer 1150 is a storage external to the video decoder 1100. In some embodiments, the decoded picture buffer 1150 is a storage internal to the video decoder 1100.

The intra-prediction module 1125 receives intra-prediction data from bitstream 1195 and according to which, produces the predicted pixel data 1113 from the decoded pixel data 1117 stored in the decoded picture buffer 1150. In some embodiments, the decoded pixel data 1117 is also stored in a line buffer (not illustrated) for intra-picture prediction and spatial MV prediction.

In some embodiments, the content of the decoded picture buffer 1150 is used for display. A display device 1155 either retrieves the content of the decoded picture buffer 1150 for display directly, or retrieves the content of the decoded picture buffer to a display buffer. In some embodiments, the display device receives pixel values from the decoded picture buffer 1150 through a pixel transport.

The motion compensation module 1130 produces predicted pixel data 1113 from the decoded pixel data 1117 stored in the decoded picture buffer 1150 according to motion compensation MVs (MC MVs). These motion compensation MVs are decoded by adding the residual motion data received from the bitstream 1195 with predicted MVs received from the MV prediction module 1175.

The MV prediction module 1175 generates the predicted MVs based on reference MVs that were generated for decoding previous video frames, e.g., the motion compensation MVs that were used to perform motion compensation. The MV prediction module 1175 retrieves the reference MVs of previous video frames from the MV buffer 1165. The video decoder 1100 stores the motion compensation MVs generated for decoding the current video frame in the MV buffer 1165 as reference MVs for producing predicted MVs.

The in-loop filter 1145 performs filtering or smoothing operations on the decoded pixel data 1117 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 12:
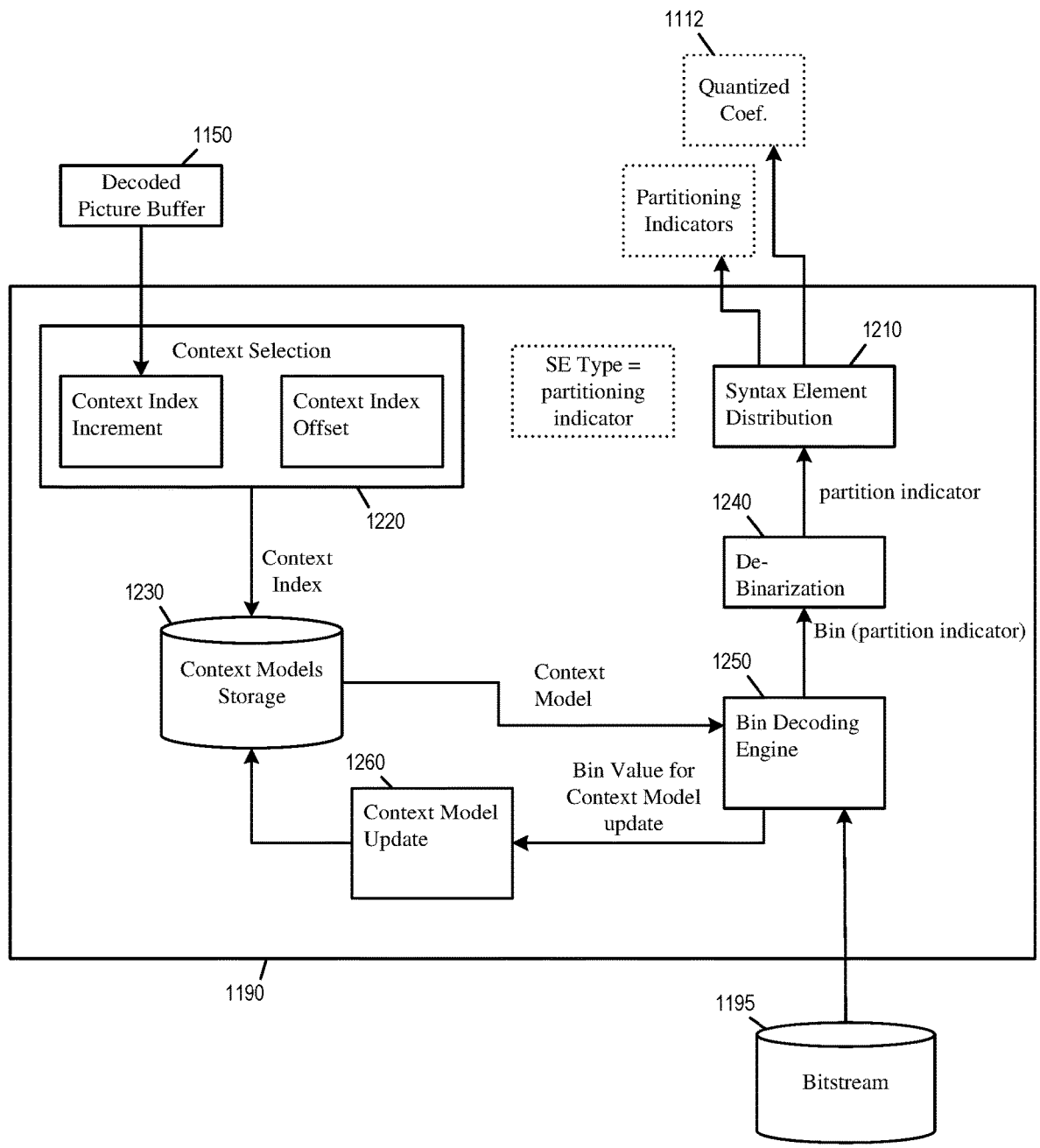
FIG. 12 illustrates portions of the video decoder that selects a context model for entropy coding a partitioning indicator of a current block of pixels based on partitioning structures of the current block and its neighboring blocks.

FIG. 12 illustrates portions of the video decoder 1100 that selects a context model for entropy coding a partitioning indicator of a current block of pixels based on partitioning structures of the current block and its neighboring blocks. Specifically, the figure illustrates the components of the entropy decoder 1190 when entropy decoding the partitioning indicator of the current block.

As illustrated, the entropy decoder 1190 includes a syntax element distribution module 1210, a context selection module 1220, a context models storage 1230, a de-binarization module 1240, a bin decoding engine 1250, and a context model update module 1260.

The bin decoding engine 1250 receives bits from the bitstream 1195 and performs binary arithmetic coding to convert the received bits into bins. The binary arithmetic coding operation relies on context modeling, which provides a context model based on probabilities specific to the type of syntax element being coded. The different context models of the different types of syntax elements are stored at the context models storage 1230. The context model update module 1260 updates the probabilities of the various context models based on the bin values that are processed at the bin decoding engine 1250. The de-binarization module 1240 converts the bins into syntax elements, including partitioning indicators. The decoded syntax elements are in turn distributed to various destinations in the video decoder 1100 by the syntax element distribution module 1210.

The context model being used by the bin decoding engine 1250 is retrieved from the context models storage 1230 based on context index provided by the context selection module 1220. The context index is based on a context index offset and a context index increment. When the syntax element being coded is a partitioning indicator, the context selection module 1220 sets the context index offset and context index increment to correspond to that particular partitioning indicator. The context selection module 1220 may set the context index increment (ctxInc) based on the partitioning structures of the current block and the neighboring blocks. The partition structures of the current block and of the neighboring blocks may be retrieved from the decoded picture buffer 1150. For example, widths and heights of the current block and of the neighboring blocks may be used to determine the ctxInc for mtt_split_flag according to Eq. (4). Binary tree depth and block shape of the current block may be used to determine the ctxInc for split_dir according to Table 4. The number of the neighboring blocks corresponding to greater quadtree depth than the current block may be used to determine the ctxInc for qt_split_flag according to Eq. (1).

Figure 13:
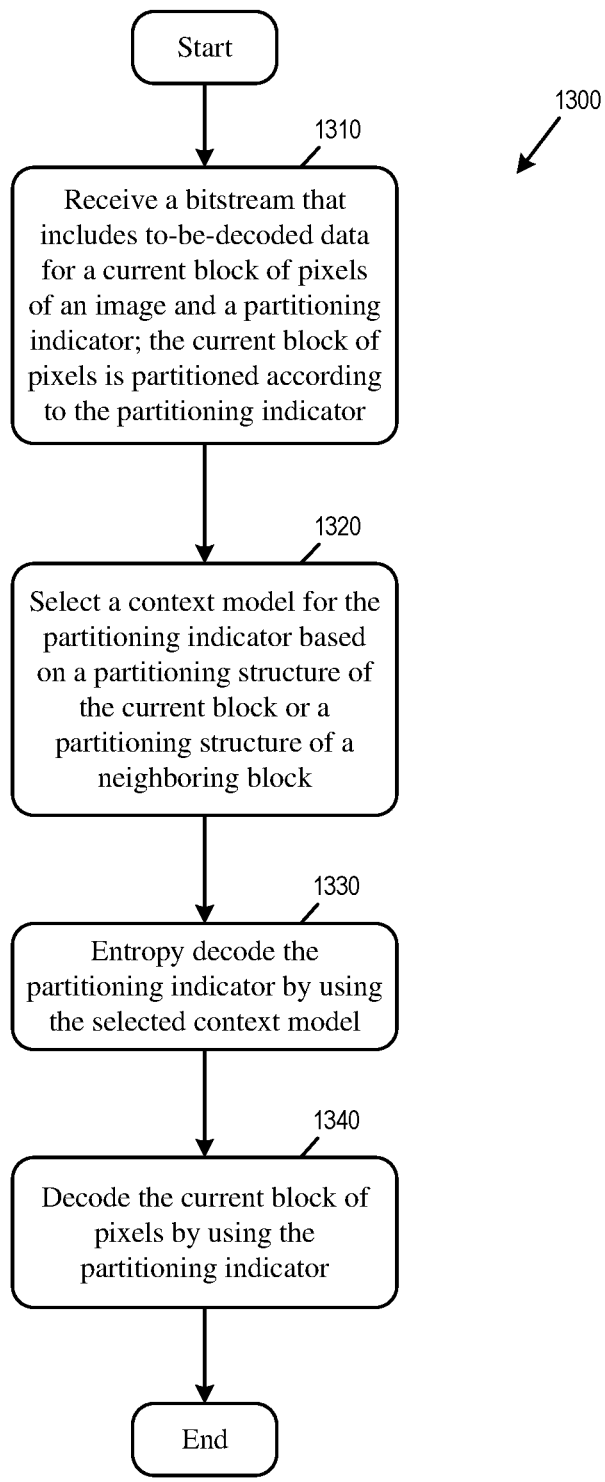
FIG. 13 conceptually illustrates a process for decoding a current block of pixels in which the context modeling of a partitioning indicator is conditioned upon the partitioning structures of the current block and its neighboring blocks.

FIG. 13 conceptually illustrates a process 1300 for decoding a current block of pixels in which the context modeling of a partitioning indicator is conditioned upon the partitioning structures of the current block and its neighboring blocks. In some embodiments, one or more processing units (e.g., a processor) of a computing device implementing the video decoder 1100 performs the process 1300 by executing instructions stored in a computer readable medium. In some embodiments, an electronic apparatus implementing the video decoder 1100 performs the process 1300.

The video decoder receives (at step 1310) a bitstream that includes to-be-decoded data for a block of pixels of an image as a current block to be decoded. The bitstream also includes a partitioning indicator according to which the current block is partitioned. The block of pixels may be a CU or a CTU. The current block may have neighboring blocks in the image that are already decoded. Some of the neighboring blocks may be partitioned in quad-tree structure or binary tree structure. The to-be-decoded block of pixels in the bitstream includes entropy coded bits for pixel data (e.g., transform coefficients) as well as a partitioning indicator for the current block. The partitioning indicator may be a flag for binary tree split (e.g., bt_split_flag), multi-type split (e.g., mtt_split_flag), quadtree split (e.g., qt_split_flag), split orientation (e.g., split_dir), or other types of partition indicator.

The video decoder selects (at step 1320) a context model for the partitioning indicator based on a partitioning structure of the current block or a partitioning structure of a neighboring block. The video decoder determines a context index for selecting a context model by setting the context index increment based on factors such as the split depth of the current block, the split depths of the neighboring blocks, shape of the current block, the shapes of the neighboring blocks, shapes and orientations of the partitioned units (e.g., square due to quad tree partition, horizontal rectangle or vertical rectangle due to binary partition or ternary partition, etc.). Section III above describes various methods of determining the context index increment of various partition indicators. The video decoder entropy decodes (at step 1330) the partitioning indicator by using the selected context model.

The video decoder decodes (at step 1340) the current block of pixels by using the partitioning indicator. Specifically, the video decoder entropy decodes the bitstream for pixel data (e.g., transform coefficients) of the current block and reconstructs the current block based on the partitioning structure indicated by the partitioning indicator. For example, if the partition indicator is qt_split_flag that indicates that the current block is quadtree split into four partitioned units, the video decoder decodes the four partitioned units separately and then assembles the decoded partitioned units into the current block.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 14:
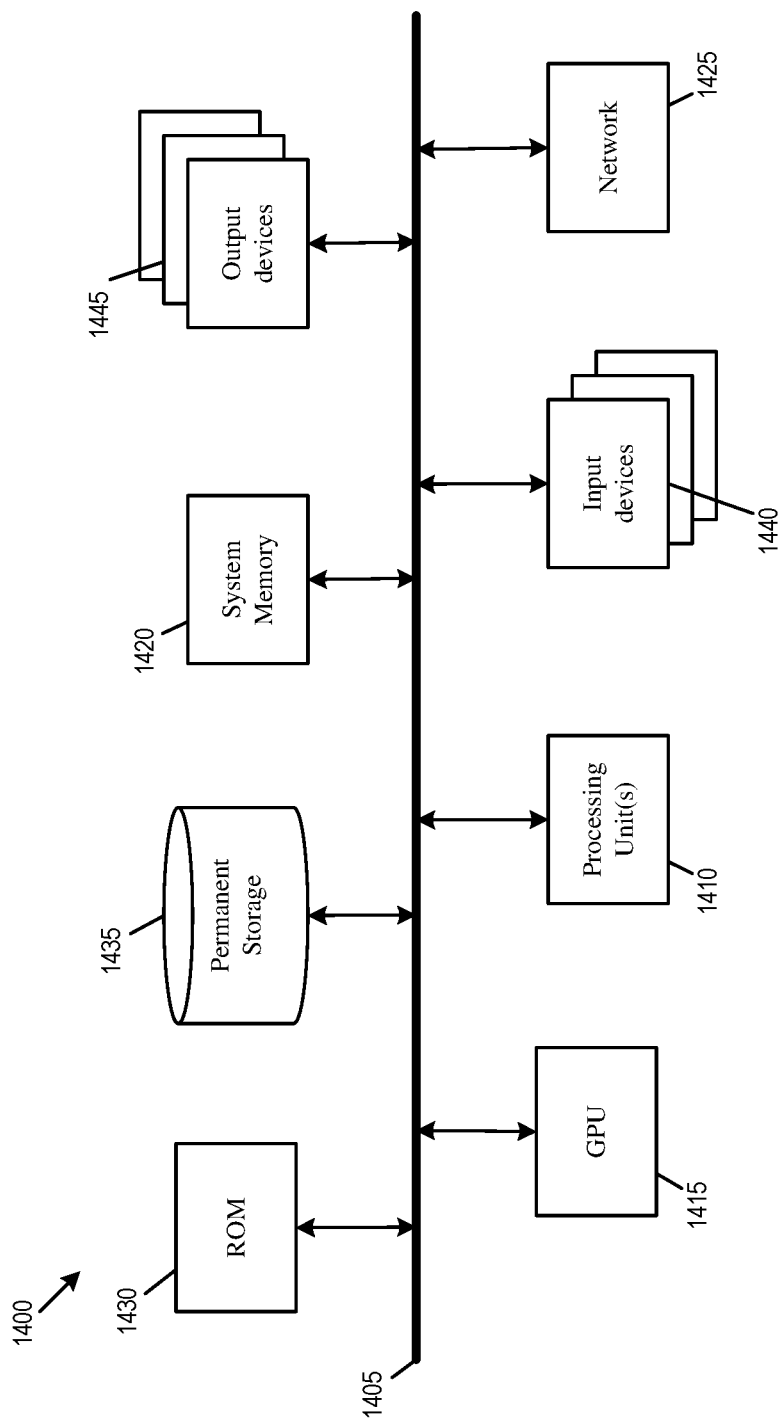
FIG. 14 conceptually illustrates an electronic system with which some embodiments of the present disclosure are implemented.

FIG. 14 conceptually illustrates an electronic system 1400 with which some embodiments of the present disclosure are implemented. The electronic system 1400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1400 includes a bus 1405, processing unit(s) 1410, a graphics-processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the GPU 1415, the read-only memory 1430, the system memory 1420, and the permanent storage device 1435.

From these various memory units, the processing unit(s) 1410 retrieves instructions to execute and data to process in order to execute the processes of the present disclosure. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the present disclosure use a mass-storage device (such as a magnetic or optical disk and its corresponding disk drive) as the permanent storage device 1435.

Other embodiments use a removable storage device (such as a floppy disk, flash memory device, etc., and its corresponding disk drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor needs at runtime. In some embodiments, processes in accordance with the present disclosure are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alphanumeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 10 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A decoding method comprising:
   receiving a bitstream comprising to-be-decoded data for a current block of pixels of an image and a partitioning indicator, wherein the current block of pixels is partitioned according to the partitioning indicator;
   selecting a context model for the partitioning indicator based on a partitioning structure of the current block of pixels or a partitioning structure of a neighboring block of pixels of the current block of pixels;
   entropy decoding the partitioning indicator by using the selected context model; and
   decoding the current block of pixels by using the partitioning indicator,
   wherein the partitioning indicator indicates whether to perform quad-tree split of the current block of pixels,
   wherein the context model is selected based on a split depth of the current block of pixels and a split depth of a spatial neighboring block of pixels,
   wherein the context model is selected based on ctxIncQt= (((qtDepthC<qtDepthA)?1:0)+((qtDepthC<qtDepthL)?1:0))+(3*(qtDepthC<T1?0:1)),
   wherein ctxIncQt represents context index increment, qtDepthC, qtDepthA, and qtDepthL represent the quadtree depths of the current block of pixels, an above neighboring block of pixels, and a left neighboring block of pixels, respectively, and
   wherein T1 is a threshold value.

2. The method of claim 1, wherein the partitioning structure of the current block of pixels specifies a split depth or a split shape of the current block of pixels.

3. The method of claim 1, wherein the threshold value is 2.

4. The method of claim 1, wherein the context model is selected based on width, height, and split depth of the current block of pixels and width, height, and split depth of the neighboring block of pixels.

5. The method of claim 1, wherein the partitioning structure of the current block of pixels or the partitioning structure of the neighboring block of pixels is used to determine a context index increment for selecting the context model.

6. An encoding method comprising:
   receiving a current block of pixels of an image;
   receiving a partitioning indicator for partitioning the current block of pixels;
   selecting a context model for the partitioning indicator based on a partitioning structure of the current block of pixels or a partitioning structure of a neighboring block of pixels of the current block of pixels; and
   encoding the current block of pixels into a bitstream by partitioning the current block of pixels according to the partitioning indicator,
   wherein the partitioning indicator is entropy coded as a syntax element of the bitstream by using the selected context model,
   wherein the partitioning indicator indicates whether to perform quad-tree split of the current block of pixels, wherein the context model is selected according to ctxIncQt=(((qtDepthC<qtDepthA)?1:0)+((qtDepthC<qtDepthL)?1:0))+(3*(qtDepthC<T1?0:1)), wherein ctxIncQt represents context index increment, qtDepthC, qtDepthA, and qtDepthL represent the quadtree depths of the current block of pixels, an above neighboring block of pixels, and a left neighboring block of pixels, respectively, and wherein T1 is a threshold value.

7. The method of claim 6, wherein the partitioning structure of the current block of pixels specifies a split depth or a split shape of the current block of pixels.

8. The method of claim 6, wherein the threshold value is set to 2.

9. The method of claim 6, wherein the context model is selected based on width, height, and split depth of the current block of pixels and width, height, and split depth of the neighboring block of pixels.

10. The method of claim 6, wherein the partitioning structure of the current block of pixels or the partitioning structure of the neighboring block of pixels is used to determine a context index increment for selecting the context model.

11. An electronic apparatus comprising:
   a memory; and
   a video decoder circuit coupled to the memory and configured to perform operations comprising:
      receiving a bitstream comprising to-be-decoded data for a current block of pixels of an image and a partitioning indicator, wherein the current block of pixels is partitioned according to the partitioning indicator;
      selecting a context model for the partitioning indicator based on a partitioning structure of the current block of pixels or a partitioning structure of a neighboring block of pixels of the current block of pixels;
      entropy decoding the partitioning indicator by using the selected context model; and
      decoding the current block of pixels by using the partitioning indicator,
   wherein the partitioning indicator indicates whether to perform quad-tree split of the current block of pixels,
   wherein the context model is selected based on a split depth of the current block of pixels and a split depth of a spatial neighboring block of pixels,
   wherein the context model is selected based on ctxIncQt=(((qtDepthC<qtDepthA)?1:0)+((qtDepthC<qtDepthL)?1:0))+(3*(qtDepthC<T1?0:1)),
   wherein ctxIncQt represents context index increment, qtDepthC, qtDepthA, and qtDepthL represent the quadtree depths of the current block of pixels, an above neighboring block of pixels, and a left neighboring block of pixels, respectively, and
wherein T1 is a threshold value.

* * * * *